United States Patent
Seo et al.

[15] 3,693,147
[45] Sept. 19, 1972

[54] DEVICE FOR DETECTING AND WARNING THE UNUSED STATE OF A VEHICLE SEAT BELT

[72] Inventors: Kiyokazu Seo, Toyota; Yoshihiro Hayashi, Kasugai, both of Japan

[73] Assignee: Kabushiki Kaisha Tokai Rika Denki Seisakusho, Wishikasugai-gun, Aichi Prefecture, Japan

[22] Filed: Jan. 20, 1971

[21] Appl. No.: 107,935

[30] Foreign Application Priority Data

Jan. 21, 1970 Japan........................45/6234

[52] U.S. Cl....................................340/52 E, 340/278
[51] Int. Cl. ...............................................B60q 1/00
[58] Field of Search ............................340/52 E, 278

[56] References Cited

UNITED STATES PATENTS

| | | |
|---|---|---|
| 3,506,305 | 4/1970 | Eieneman, Jr. et al...340/52 E |
| 3,375,495 | 3/1968 | Burns........................340/52 E |
| 3,455,410 | 7/1969 | Wilson..........................340/278 |

*Primary Examiner*—John W. Caldwell
*Assistant Examiner*—Glen R. Swann, III
*Attorney*—Woodhams, Blanchard & Flynn

[57] ABSTRACT

A device for detecting and warning the unused state of a vehicle seat belt, comprising a detecting circuit having seat switches adapted to be closed on sensing the occupation of the seats and belt switches adapted to be opened by drawing out a given length of seat belt to wear.

2 Claims, 9 Drawing Figures

PATENTED SEP 19 1972

INVENTORS
KIYOKAZU SEO
YOSHIHIRO HAYASHI

BY Woodhams, Blanchard & Flynn
ATTORNEYS

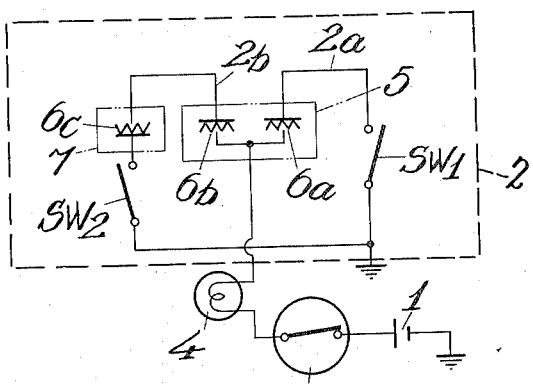
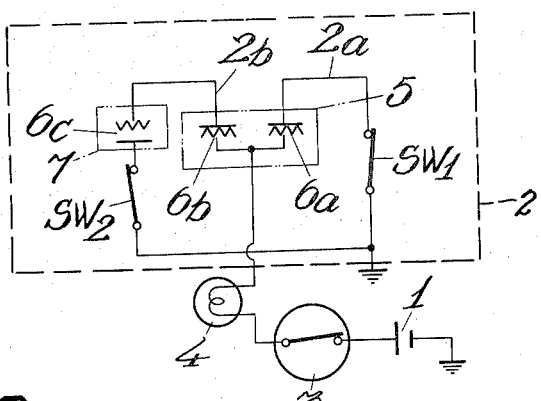
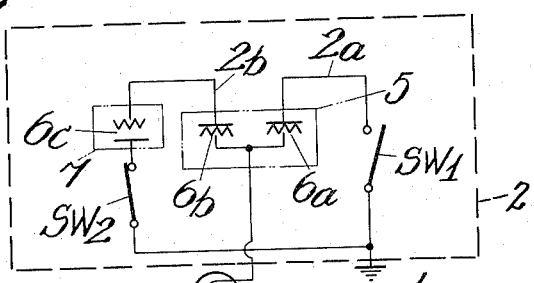
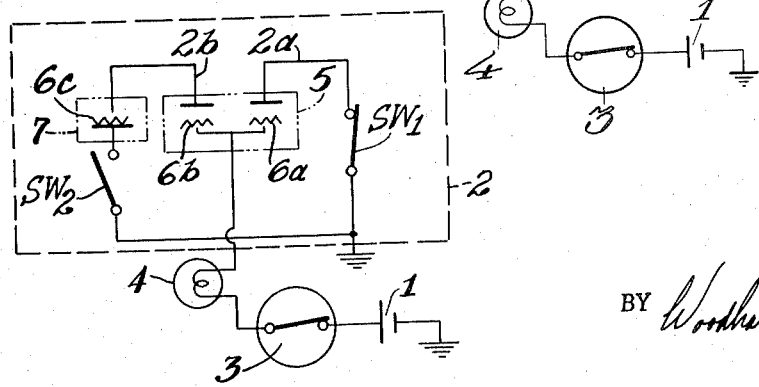
INVENTORS
KIYOKAZU SEO
YOSHIHIRO HAYASHI
BY Woodhams, Blanchard & Flynn
ATTORNEYS

DEVICE FOR DETECTING AND WARNING THE UNUSED STATE OF A VEHICLE SEAT BELT

FIELD OF INVENTION

This invention relates to a device in an automobile for detecting and warning the unused state of a seat belt and more particularly to a device in an automobile provided with seat belts not only on a driver's seat but also on other passenger seats, which, if at least one of the occupants of the seats provided with seat belts does not use a seat belt, keeps a detecting circuit in a closed state thereby to give him warning to wear his seat belt.

BACKGROUND OF THE INVENTION

Though it is prescribed in a law that a seat belt shall be provided in an automobile, in fact, only few persons use it. Therefore, it has not actually served to prevent death or injury when an accident occurs.

In this connection, it is to be noted that the present invention is one which enables an alarming means such as an alarming buzzer to be kept on operating or makes it impossible to start an automobile if all of occupants who sit down on seats provided with seat belts don't use the respective seat belts to make a drive safe.

It is an object of the present invention to provide a device effective to call upon an occupant of an automobile to wear a seat belt.

SUMMARY OF THE INVENTION

According to the present invention, there is provided a device in an automobile for detecting and warning the unused state of a seat belt which comprises a a power source, a power-off switch connected in series with said power source, an alarming means connected in series with said power-off switch, and a detecting circuit connected in series with said alarming means and divided into at least two branch circuits. One of the branch circuits includes a seat switch provided in a driver's seat and adapted to be closed on sensing the occupation of the driver's seat and a belt switch associated with the driver's seat belt and adapted to be opened on sensing the drawing-out motion of a given length of the seat belt. The other branch circuit includes the seat switch provided in the driver's s seat, another seat switch provided in a passenger's seat and adapted to be closed on sensing the occupation of the passenger seat, and another belt switch associated with the passenger's seat belt and adapted to be opened on sensing the drawing-out motion of a given length of the seat belt.

BRIEF DESCRIPTION OF THE DRAWINGS

The invention will be better understood from the following description taken in connection with the accompanying drawings in which:

FIGS. 3 to 9 are diagramatical views showing operating states of the device according to the present invention.

DETAILED DESCRIPTION

Figure 1:
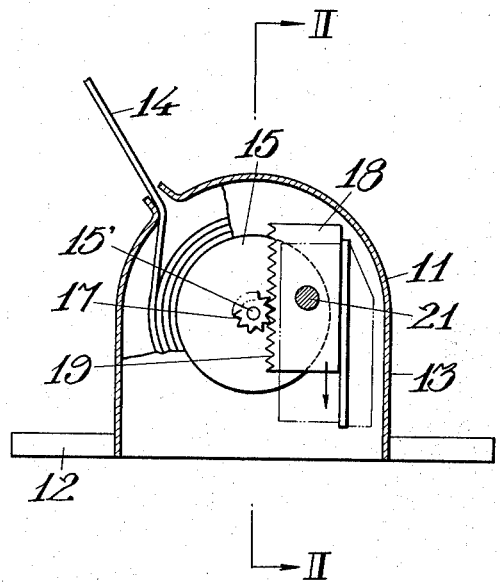
FIG. 1 is a vertical cross sectional view of one embodiment of a seat belt unit employed in the present invention taken along line I—I of FIG. 2 with part of it cut out.
Figure 2:
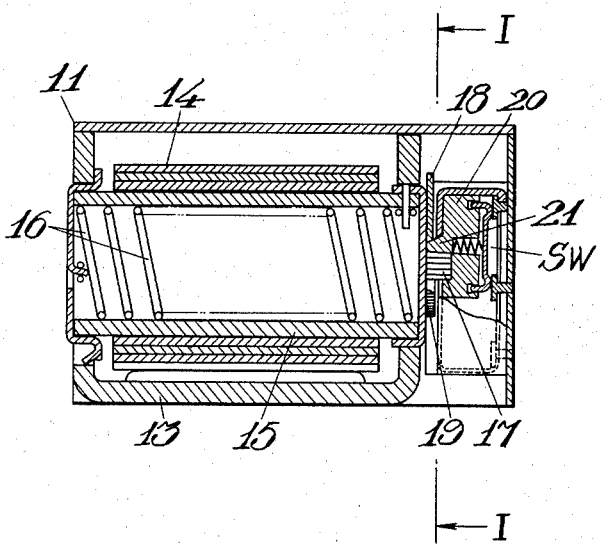
FIG. 2 is a vertical longitudinal sectional view of the same taken along line II—II of FIG. 1.

Referring now to FIGS. 1 and 2, there is illustrated one embodiment of a seat belt unit 11 having a belt switch SW which is normally closed and adapted to be opened when a given length of the seat belt is drawn out to be used. In a reel case 13 having a portion to be fitted to a side of a seat, is rotatably mounted a winding shaft 15 to which one end of a belt 14 is fixed. Inside said winding shaft 15 is provided a spring 16 which is urged to retract the belt 14 when said belt 14 is drawn out, thereby permitting automatic retracting of the belt 14. To a central shaft 15' protruding from the side of the winding shaft 15 at its central portion is fitted a pinion 17 adapted to rotate together with said shaft 15'. In said reel case 13 are further provided a movable plate 18 having a rack 19 which engages with said pinion 17 and adapted to move linearly, and a movable contact plate 20 of the belt switch SW which is adapted to move slidingly. A projection 21 is provided on the contact plate 20 and engages with said movable plate 18. Thus, when a given length of the belt 14 is retracted into the reel case 13 by means of the winding shaft 15, the belt switch is closed. On the other hand, when a given length of the belt 14 is drawn out from the reel case 13, the rack 19 and resultantly the movable plate 18 and the contact plate 20 are moved in the direction of an arrow of FIG. 1 by means of the pinion 17 which rotates with the winding shaft 15, to open the belt switch SW.

Referring now to FIGS. 3 to 8, there are illustrated operating conditions of a device according to the present invention, in which numeral 1 designates a power source and numeral 2 indicates a detecting circuit having two branches 2a and 2b. A power-off switch, such as an ignition switch 3 and an alarm means 4, such as an indicating lamp or a buzzer, are connected between the detecting circuit 2 and the power source 1. Numeral 5 designates a seat switch provided in a driver's seat and adapted to be closed on sensing the occupation of the seat. In the present embodiment, the seat switch 5 has two sets of contacts 6a and 6b which are connected in parallel with each other and included in the branch circuits 2a and 2b, respectively. In the branch circuit 2a having the contact 6a is included a belt switch $SW_1$ which is adapted to be opened when a given length of the seat belt of the driver's seat is drawn out. Numeral 7 designates a seat switch for a passenger seat other than the seat for the driver, which has a contact 6c adapted to be closed on sensing the occupation of the seat. The circuit branch 2b has a belt switch $SW_2$ connected in series with the seat switch 7, which belt switch $SW_2$ is adapted to be read opened when a given length of the seat belt of said seat is drawn out.

OPERATION

Figure 3:
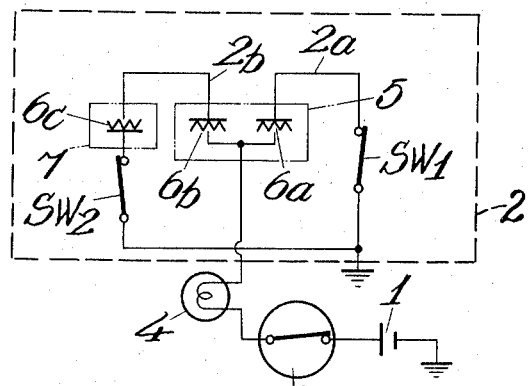

As illustrated in FIG. 3, in case both the driver's seat and the passenger seat are occupied by the respective occupants to close the seat switches 5 and 7 and if both the seat belts are not drawn out to be used, the belt switches $SW_1$ and $SW_2$ are kept in a closed position, so that, when the ignition switch 3 is closed as shown in the drawings, the complete detecting circuit 2 is closed to drive the indicator 4.

Figure 4:
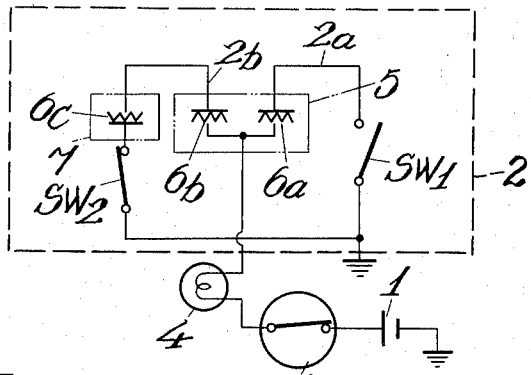
Figure 5:
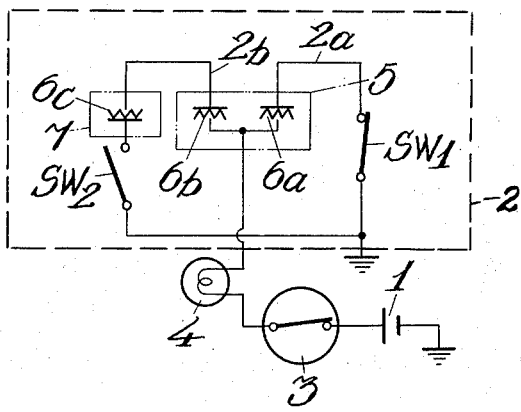

As shown in FIG. 4, in case the seat belt of the driver's seat is drawn out and used by the occupant to open the belt switch $SW_1$ but the seat belt of the passenger seat is not drawn out, the detecting circuit branch 2a is kept closed to operate the alarm means 4. While, as shown in FIG. 5, in case the seat belt of the passenger seat is used to open the belt switch $SW_2$ and the seat belt of the driver's seat is not drawn out, the detecting circuit branch 2a is kept closed for operating the alarm means 4.

As shown in FIG. 6, in case the seat belts of both the driver's seat and the passenger seat are used, the belt switches $SW_1$ and $SW_2$ are opened and the detecting circuit 2 is resultantly opened to prevent the operation of the indicator or alarm 4.

In case only the driver's seat 5 is occupied and the passenger seat is not occupied as seen in FIGS. 7 and 8, the seat switch 7 is kept opened and the branch circuit 2b is therefore opened. In case the seat belt of the driver's seat is not used, the belt switch $SW_1$ is kept in a closed position as shown in FIG. 7 to retain the detecting circuit branch 2a operative to the indicator 4. Whereas, in case the seat belt is used by the driver to open the seat switch $SW_1$ as shown in FIG. 8, the detecting circuit branch 2a is opened to prevent the operation of the indicator 4. As shown in FIG. 9, in case the seat for the driver is not occupied, the whole circuit is in an open or OFF condition independent of the condition of the belt switch $SW_2$, and accordingly the alarming means 4 is not operated.

While in the present embodiment, two sets of contacts 6a and 6b are employed in the seat switch 5 of the driver's seat, one set of contacts is sufficient for the purpose.

Thus it can be appreciated that the present invention provides a device which can perform accurate detection of the unused state of a seat belt in case a driver alone or a plurality of occupants are in an automobile and occupy respective seats provided with seat belts and if all of the occupants don't use the respective seat belt, and eliminate confirmation procedure whether each of the occupants wears a seat belt or not, thereby permitting safe driving.

What is claimed is:

1. A system for a vehicle for detecting and indicating the unused state of seat belts, comprising:
   a power source;
   a power-off switch connected in series with said power source;
   alarm means connected in series with said power-off switch; and
   a detecting circuit connected in series with said alarm means and divided into at least two parallel branch circuits, said detecting circuit including first normally open switch means associated with the driver's seat and adapted to be closed on sensing the occupation of the driver's seat, said first switch means being associated with both of said branch circuits;
   one of said branch circuits including second normally closed switch means coacting with the seat belt associated with the driver's seat and adapted to be opened on sensing the drawing out motion of a given length of the seat belt, said second switch means being connected in series with said first switch means;
   the other branch circuit including third normally open switch means associated with a passenger's seat and adapted to be closed on sensing the occupation of the passenger's seat, and fourth normally closed switch means coacting with the seat belt associated with the passenger's seat and adapted to be opened on sensing the drawing-out motion of a given length of the seat belt, the third and fourth switch means being connected in series with one another and in series with said first switch means.

2. A system according to claim 1, wherein said first switch means includes two sets of contacts contacts connected in parallel with one another and in series with said alarm means, one set of contacts being included in one of said branch circuits and the other set of contacts being included in the other of said branch circuits.

* * * * *